(12) United States Patent
Otake et al.

(10) Patent No.: US 8,094,412 B2
(45) Date of Patent: Jan. 10, 2012

(54) MAGNETIC DISK DEVICE AND HEAD STACK ASSEMBLY

(75) Inventors: Noritaka Otake, Ibaraki (JP); Keiko Watanabe, Ibaraki (JP); Toshihiko Shimizu, Ibaraki (JP); Kenji Tomida, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 547 days.

(21) Appl. No.: 12/313,291

(22) Filed: Nov. 18, 2008

(65) Prior Publication Data
US 2009/0147406 A1    Jun. 11, 2009

(30) Foreign Application Priority Data
Dec. 11, 2007    (JP) .................................. 2007-319320

(51) Int. Cl.
*G11B 5/48*    (2006.01)
(52) U.S. Cl. ............... 360/244.5; 360/244.7; 360/244.8; 360/294.4

(58) Field of Classification Search ................ 360/194.4, 360/126, 125, 266.3, 234.5, 244.1, 97, 264.9, 360/245.8, 244.5, 244.7, 244, 245.83
See application file for complete search history.

(56) References Cited

U.S. PATENT DOCUMENTS

| | | |
|---|---|---|
| 6,775,106 B1 | 8/2004 | Williams et al. |
| 2005/0157430 A1 | 7/2005 | Korkowski et al. |
| 2006/0098335 A1* | 5/2006 | Hirata et al. ................. 360/125 |

* cited by examiner

*Primary Examiner* — Thong Q Le

(57) ABSTRACT

Embodiments of the present invention relate disk drives, and in particular to realizing a positioning accuracy equal to that of an actuator having the mountable maximum number of suspensions, in an actuator having the smaller number of suspensions than the mountable maximum number. An embodiment of a magnetic disk device includes an actuator having an arm to which a suspension for applying a predetermined load onto a slider with a magnetic head is attached, and an arm to which a plate is attached instead of having the suspension. The plate attached to the arm in place of the suspension has a partially small section with respect to a section perpendicular to an arm longitudinal direction (constricted part), and the constricted part is located between a plate leading end and an arm attachment part.

8 Claims, 7 Drawing Sheets

MAGNETIC DISK DEVICE AND HEAD STACK ASSEMBLY

CROSS-REFERENCE TO RELATED APPLICATION

The instant nonprovisional patent application claims priority to Japanese Patent Application No. 2007-319320, filed Dec. 11, 2007 and which is incorporated by reference in its entirety herein for all purposes.

BACKGROUND OF THE INVENTION

A magnetic disk device includes a magnetic disk for holding magnetic information, a slider on which a magnetic head for recording or reproducing the magnetic information in the magnetic disk is mounted, and an actuator rotatably provided to move the slider in the radial direction of the magnetic disk. The actuator has a suspension for holding the slider at the leading end side and applying a predetermined load on the slider and an arm for holding the base side of the suspension.

Among magnetic disk devices, there are magnetic disk devices each including an actuator having the mountable maximum number of suspensions (hereinafter, referred to as A) and magnetic disk devices each including an actuator having the smaller number of suspensions than that of those magnetic disk devices for reducing its storage capacity. This is to suppress the rise in manufacturing cost by using actuators having the same structure and adjusting the number of suspensions mounted thereon because the manufacturing cost of the actuators rises when the actuator structures vary depending on storage capacity of the magnetic disk device. In this case, in current magnetic disk devices, in place of suspensions, plates for providing mass balances of the actuators are attached to the arms with no suspension.

For example, in a magnetic disk device described in JP-A-2001-126428 ("Patent Document 1"), the frequency characteristic of an actuator is improved by attaching a weighting segment to an arm with no suspension to increase the lateral rigidity and mass of the weighting segment for equalizing the resonance frequency of the arm with no suspension and the resonance frequency of the arm with a suspension.

Since it is necessary for the suspension to flexibly support the slider, the rigidity of the suspension can not be made higher, and thus, the natural frequency in the disk radial direction can not be made so much higher. On the other hand, since the conventional plate has higher rigidity than that of the suspension, its natural frequency in the disk radial direction is significantly higher than that of the suspension. Accordingly, in the case of the actuator to which the conventional plate is attached in place of the suspension with the slider, the frequency characteristic of the actuator varies depending on the number of mounted suspensions and it is difficult to secure the equal positioning accuracy to that of the actuator with the maximum number of suspensions.

BRIEF SUMMARY OF THE INVENTION

Embodiments of the present invention relate disk drives, and in particular to realizing a positioning accuracy equal to that of an actuator having the mountable maximum number of suspensions, in an actuator having the smaller number of suspensions than the mountable maximum number. An embodiment of a magnetic disk device includes an actuator having an arm to which a suspension for applying a predetermined load onto a slider with a magnetic head is attached, and an arm to which a plate is attached instead of having the suspension. The plate attached to the arm in place of the suspension has a partially small section with respect to a section perpendicular to an arm longitudinal direction (constricted part), and the constricted part is located between a plate leading end and an arm attachment part.

DETAILED DESCRIPTION OF THE INVENTION

Figure 1:
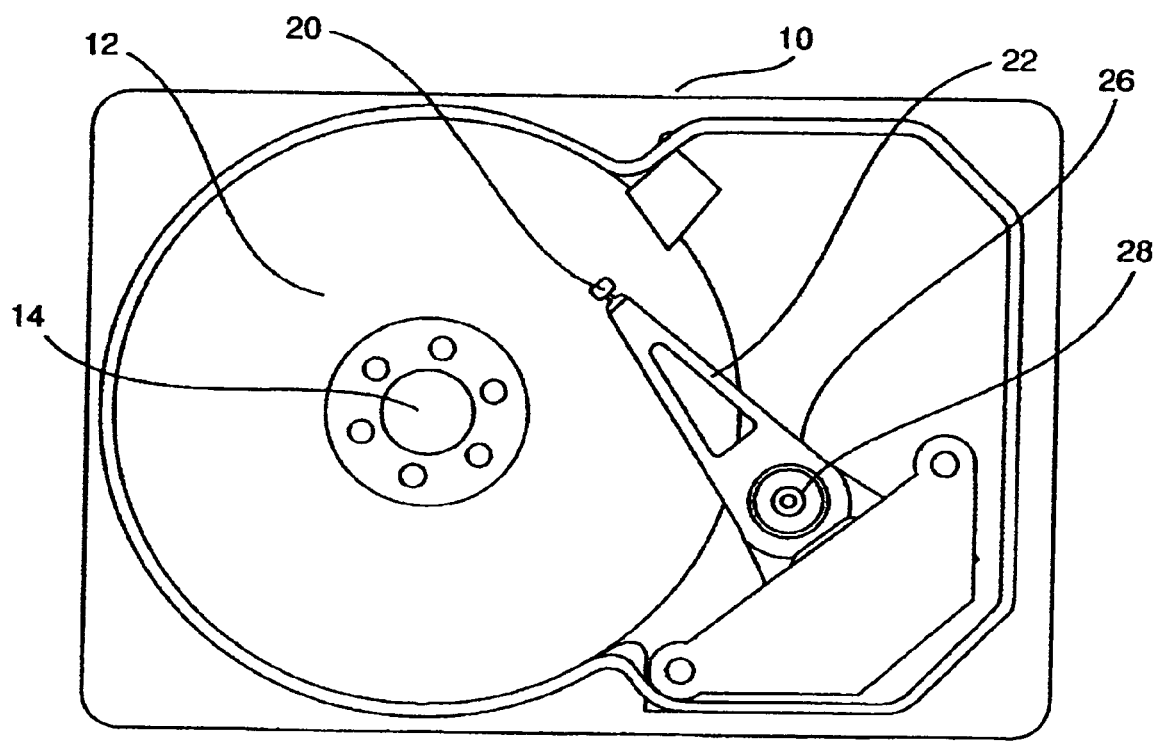
FIG. 1 shows a top view of a magnetic disk device of an embodiment of the present invention.

Embodiments of the present invention relate to a structure of a magnetic disk device. Further, specifically, the present invention relates to improvement in positioning accuracy of a magnetic head of a magnetic disk device.

A purpose of certain embodiments of the invention is to provide a magnetic disk device capable of securing the positioning accuracy of a magnetic head when the number of suspensions mounted on an actuator varies.

In order to achieve the above purpose, in a magnetic disk device of an embodiment of the invention, the magnetic disk device includes a magnetic disk, an actuator having a plurality of arms and swingable in a radial direction of the magnetic disk, a suspension attached to one or some of the plurality of arms for holding a slider on which a magnetic head for recording or reproducing the magnetic information in the magnetic disk is mounted and providing a predetermined load on the slider, and a plate attached to one or some of the plurality of arms, and is characterized in that the plate has a part with a partially small section in a section perpendicular to a longitudinal direction of the arm, and the part with the partially small section is located between a leading end of the plate and an attachment part to the arm.

The part with the partially small section of the plate is a constricted part of the plate.

Further, the leading end of the plate is divided into a plurality of portions, and the plate has a plurality of the parts with the partially small section between the respective divided leading end portions and the attachment part to the arm.

Furthermore, the part with the partially small section of the plate has a step along a perpendicular direction to a surface of the magnetic disk.

Another purpose of certain embodiments of the invention is to provide a head stack assembly with a frequency characteristic that changes little when the number of suspensions mounted on an actuator varies.

In order to achieve the above other purpose, in a head stack assembly of an embodiment of the invention, the head stack assembly includes an actuator having one or some arms, a suspension attached to one or some of the one or some arms, a slider attached to the suspension for mounting a magnetic head, and a plate attached to one or some of the one or some arms, and is characterized in that the plate has a part with a partially small section in a section perpendicular to a longitudinal direction of the arm, and the part with the partially small section is located between a leading end of the plate and an attachment part to the arm.

According to embodiments of the invention, a head stack assembly with a frequency characteristic that changes little when the number of suspensions mounted on an actuator varies can be provided. Further, in a magnetic disk device, the positioning accuracy of a magnetic head can be secured when the number of suspensions mounted on an actuator varies.

Hereinafter, embodiments of the invention will be described using the drawings.

Embodiment 1

Figure 2:
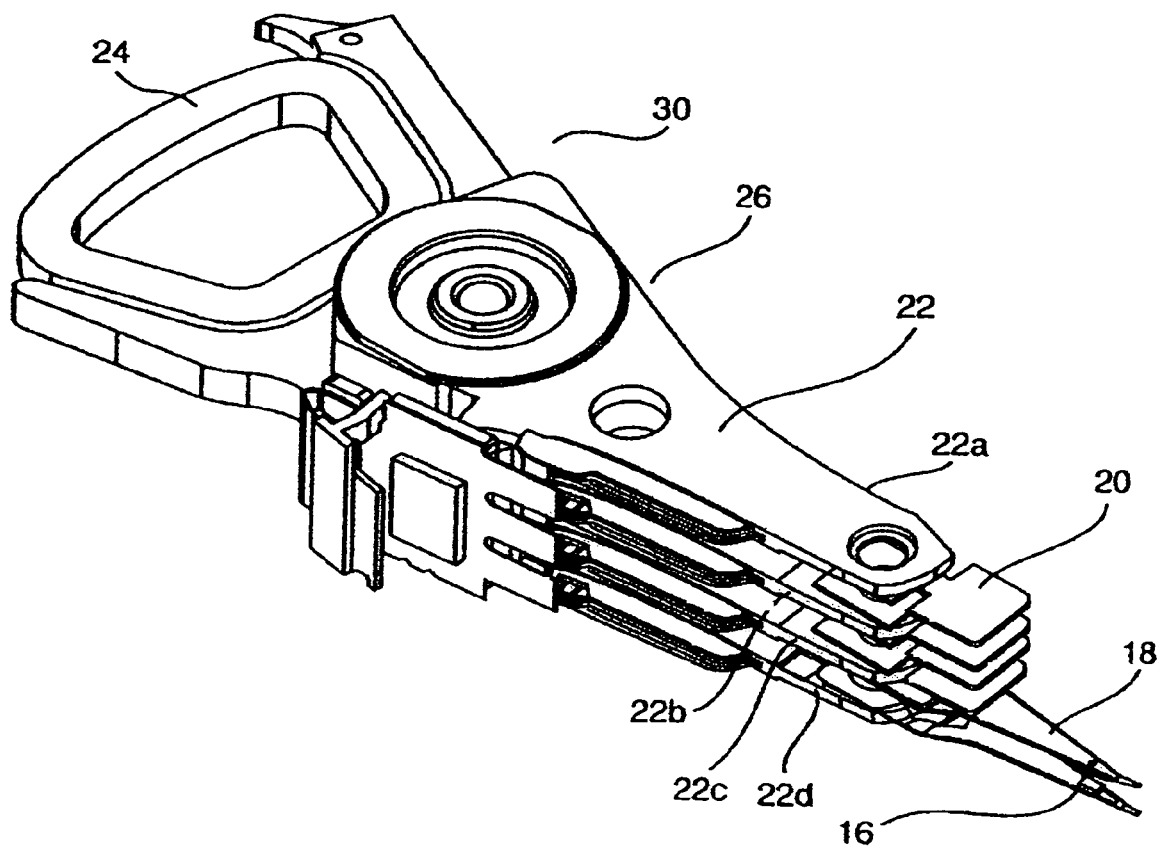
FIG. 2 shows a perspective view of a head stack assembly of an embodiment of the present invention.

FIG. 1 is a top view showing a schematic configuration of a magnetic disk device according to embodiment 1, and FIG. 2 is a perspective view of an actuator. One or some magnetic disks 12 for recording information are placed in the magnetic disk device 10, and the device includes a spindle motor 14 for turning the magnetic disk 12, a slider 16 on which a magnetic head for recording or reproducing the magnetic information in the magnetic disk 12 is mounted, a suspension 18 for supporting the slider 16, and an actuator 26 having a plurality of arms 22 to which the suspensions 18 or plates 20 are attached and a voice coil 24. The actuator 26 is swingably supported with respect to a pivot shaft 28 and moves the slider 16 in a radial direction of the magnetic disk 12 via the suspension 18. The suspension 18 applies a predetermined load on the slider 16, and the slider 16 floats above the magnetic disk when the load and the lift received from the viscose laminar flow generated by the turn of the magnetic disk 12 are balanced. Here, as shown in FIG. 2, a structure in which the suspensions 18 or plates 20 are attached to the respective arms 22 of the actuator 26 is referred to as a head stack assembly 30.

The head stack assembly 30 shown in FIG. 2 has four arms 22a, 22b, 22c, 22d, and the suspensions 18 are attached to the upside of the lowermost arm 22d and the downside of the second lowest arm 22c in FIG. 2. The plates 20 are attached to the upside of the arm 22c, the upside and downside of the arm 22b, and the downside of the arm 22a.

Figure 4:
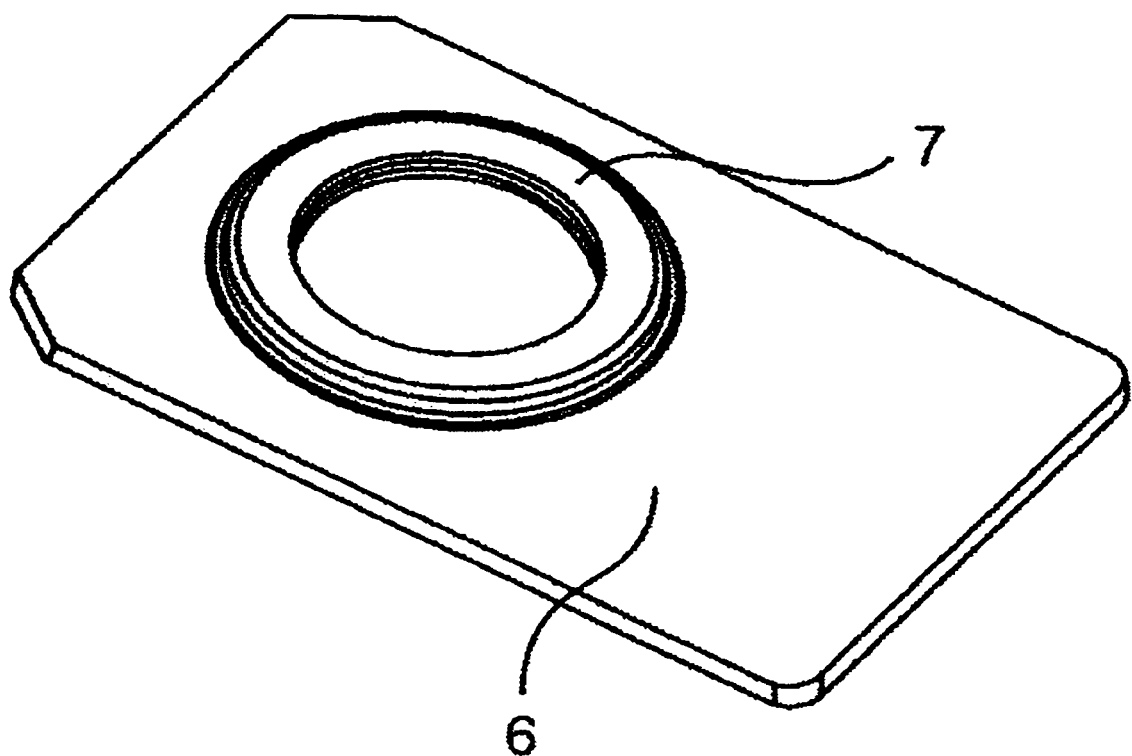
FIG. 4 shows a perspective view of a conventional plate.

Since it is necessary for the suspension 18 to flexibly support the slider 16, the rigidity of the suspension can not be made so much higher. Since a plate 6 having a conventional structure shown in FIG. 4 has higher rigidity than that of the suspension 18, the frequency characteristic of the actuator on which they are mounted varies.

Figure 3:
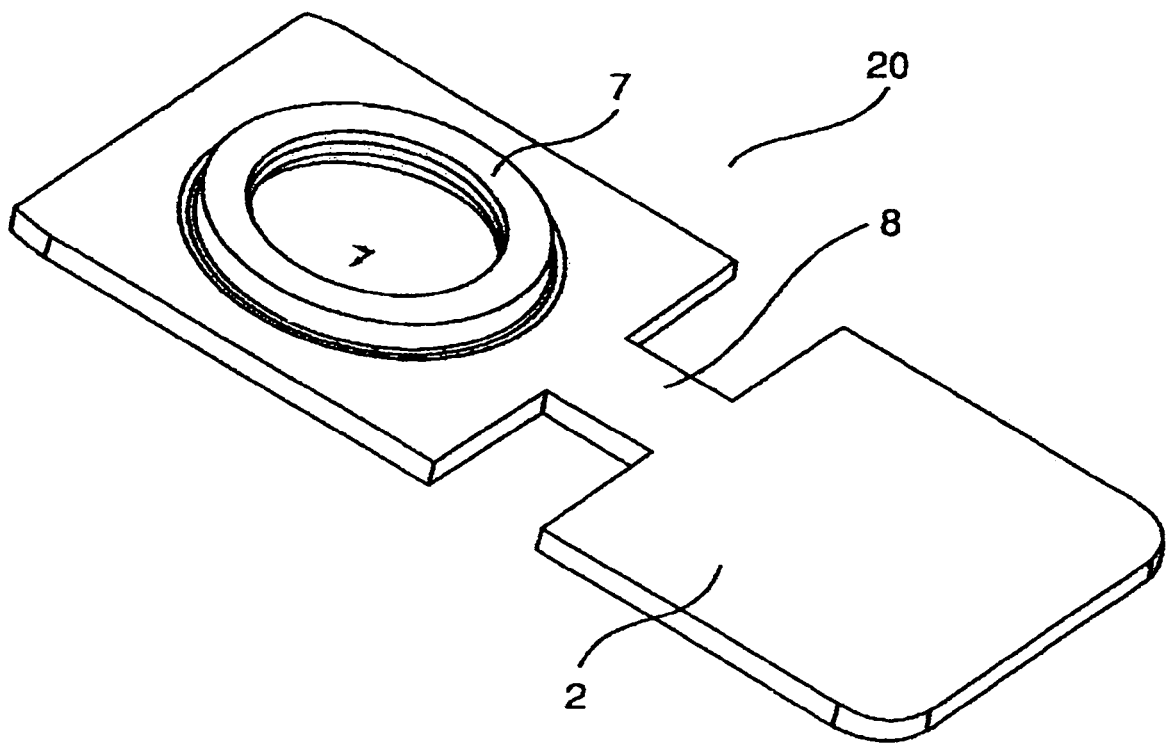
FIG. 3 shows a perspective view of a plate of an embodiment of the present invention.

FIG. 3 is a perspective view of the plate 20 of the embodiment. The plate 20 of the embodiment is flexible because the plate has a structure having a flexible constricted part 8 between an arm attachment part 7 and a plate leading end 2 as shown in FIG. 3, and the vibration characteristic of the plate 20 and the vibration characteristic of the suspension 18 can be made similar. Accordingly, the positioning accuracy equal to or higher than that of the actuator A can be secured without deteriorating the frequency characteristic of the actuator having the smaller number of suspensions 18 compared to the frequency characteristic of A. Thereby, the storage capacity of the magnetic disk device 10 with the reduced number of suspensions 18 can be made larger than that of the magnetic disk device using conventional plates having high rigidity.

Figure 5:
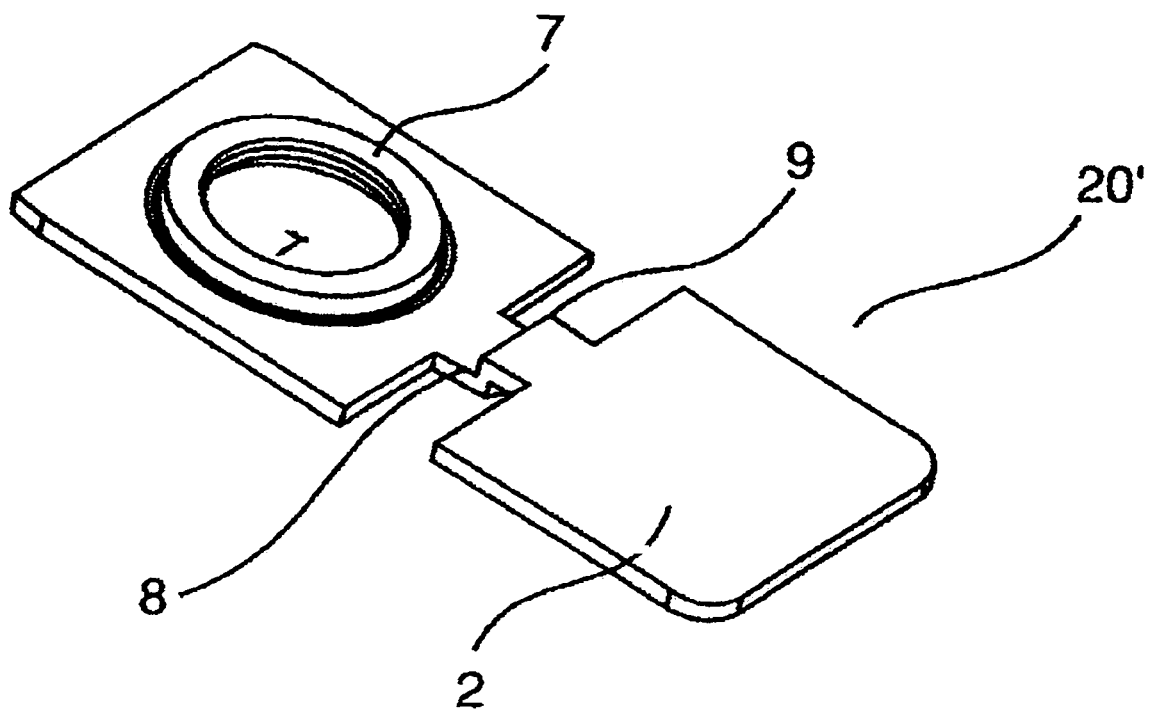
FIG. 5 shows a perspective view of a plate of another embodiment of the present invention.
Figure 6:
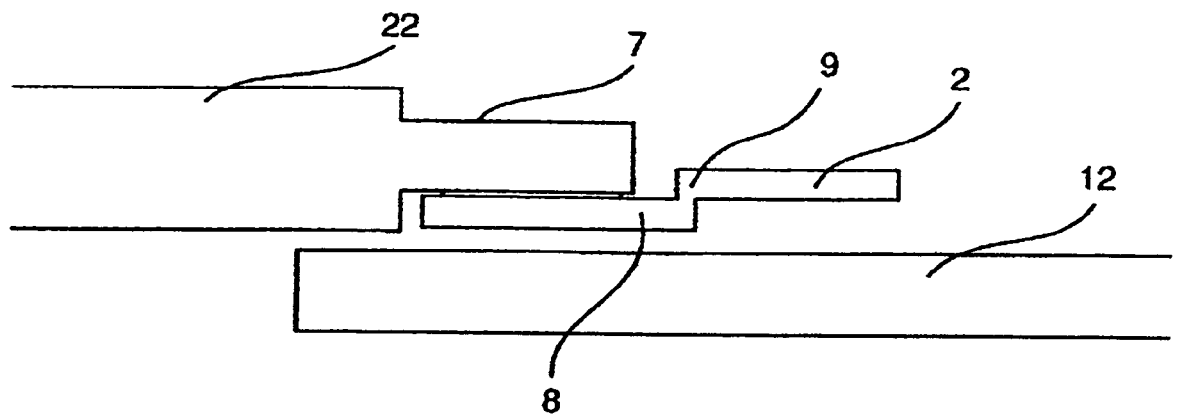
FIG. 6 shows a schematic view of the plate of FIG. 5 viewed from the side.

Next, embodiment 2 of the invention will be described using FIGS. 5 and 6. A plate 20' has a shape provided with a step portion 9 in the constricted part 8 for a wider gap between the magnetic disk 12 and the plate 20'. As shown in FIG. 6, the gap between the leading end 2 of the plate 20' and the magnetic disk 12 is wide, and the arm 22 is hard to collide with the magnetic disk 12 when vibrating. Further, since the shape has the constricted part 8, the positioning accuracy equal to or higher than that of the above described actuator A can be secured without deterioration in the frequency characteristic of the actuator applying the plate 20' in FIG. 5 compared to the frequency characteristic of A. Thereby, the storage capacity of the magnetic disk device 10 with the reduced number of suspensions 18 can be made larger than that of the magnetic disk device using conventional plates having high rigidity.

Figure 7:
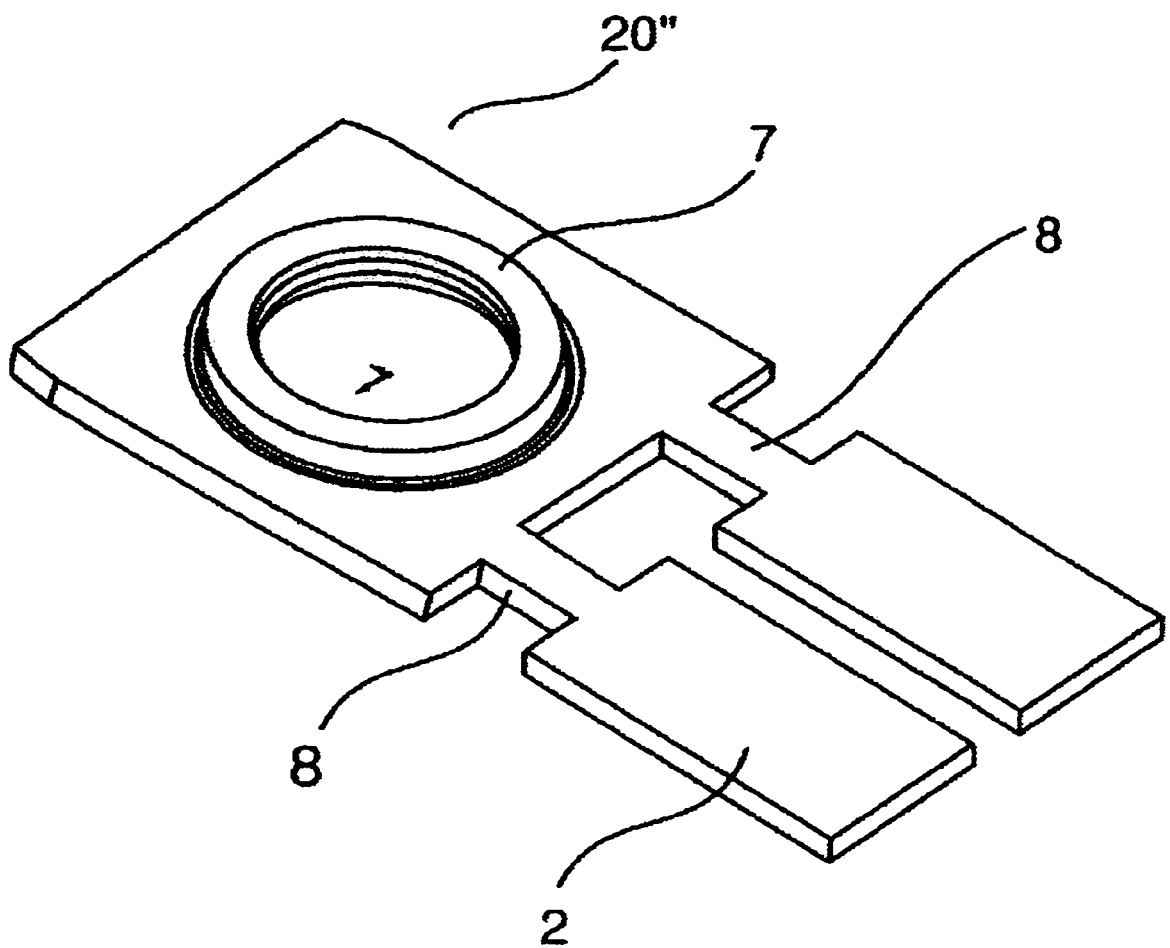
FIG. 7 perspective view of a plate of another embodiment of the present invention.

Next, embodiment 3 of the invention will be described using FIG. 7. FIG. 7 shows a shape having a feature of the invention by dividing the leading end of a plate 20" into a plurality of portions. In embodiment 1, the part ahead the constricted part 8 is wider and easily get twisted, and that may negatively affect the frequency characteristic. In the shape of embodiment 3, the part ahead the constricted part 8 can be designed to be narrower, and hard to get twisted. Further, since the shape has the constricted part 8, the positioning accuracy equal to or higher than that of the above described actuator A can be secured without deterioration in the frequency characteristic of the actuator applying the plate 20" in FIG. 7 compared to the frequency characteristic of A. Thereby, the storage capacity of the magnetic disk device 10 with the reduced number of suspensions 18 can be made larger than that of the magnetic disk device using conventional plates having high rigidity.

As described above, according to embodiments of the invention, the frequency characteristic of the actuator can be adjusted by attaching plates having the natural frequency near the natural frequency of the suspensions in place of the suspensions to the arms of the actuator. Thereby, the frequency characteristic of the actuator applying the invention is not deteriorated compared to the frequency characteristic of the above described actuator A and the positioning accuracy equal to or higher than that of the above described A can be secured. Thus, the storage capacity of the magnetic disk device with the reduced number of magnetic heads can be made larger than that of the magnetic disk device using conventional plates having high rigidity.

What is claimed is:

1. A magnetic disk device comprising:
   a magnetic disk;
   an actuator having a plurality of arms and swingable in a radial direction of the magnetic disk;
   a suspension attached to one or some of the plurality of arms for holding a slider on which a magnetic head for recording or reproducing the magnetic information in the magnetic disk is mounted, and providing a predetermined load on the slider; and
   a plate attached to one or some of the plurality of arms not having the suspension attached thereto,
   wherein the plate has a part with a partially small section in a section perpendicular to a longitudinal direction of the arm, and the part with the partially small section is located between a leading end of the plate and an attachment part to the arm.

2. The magnetic disk device according to claim 1, wherein the part with the partially small section of the plate is a constricted part of the plate.

3. The magnetic disk device according to claim 1, wherein the leading end of the plate is divided into a plurality of portions, and the plate has a plurality of the parts with the partially small section between the respective divided leading end portions and the attachment part to the arm.

4. The magnetic disk device according to claim 1, wherein the part with the partially small section of the plate has a step along a perpendicular direction to a surface of the magnetic disk.

5. A head stack assembly comprising:
an actuator having a plurality of arms;
a suspension attached to one or some of the plurality of arms;
a slider attached to the suspension for mounting a magnetic head; and
a plate attached to one or some of the plurality of arms not having the suspension attached thereto, wherein the head stack assembly is characterized in that the plate has a part with a partially small section in a section perpendicular to a longitudinal direction of the arm, and the part with the partially small section is located between a leading end of the plate and an attachment part to the arm.

6. The head stack assembly according to claim 5, wherein the part with the partially small section of the plate is a constricted part of the plate.

7. The head stack assembly according to claim 5, wherein the leading end of the plate is divided into a plurality of portions, and the plate has a plurality of the parts with the partially small section between the respective divided leading end portions and the attachment part to the arm.

8. The head stack assembly according to claim 5, wherein the part with the partially small section of the plate has a step along a perpendicular direction to a surface of the plate.

* * * * *